United States Patent
O'Neill et al.

(10) Patent No.: US 9,639,381 B2
(45) Date of Patent: *May 2, 2017

(54) SHARING APPLICATIONS IN A JAVA VIRTUAL MACHINE

(71) Applicant: Amazon Technologies, Inc., Seattle, WA (US)

(72) Inventors: Brian S. O'Neill, Bellevue, WA (US); Matthew L. Trahan, Seattle, WA (US); Diwakar Chakravarthy, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,479

(22) Filed: Jun. 3, 2015

(65) Prior Publication Data
US 2015/0268976 A1     Sep. 24, 2015

Related U.S. Application Data

(63) Continuation of application No. 12/974,912, filed on Dec. 21, 2010, now Pat. No. 9,075,640.

(51) Int. Cl.
*G06F 9/44* (2006.01)
*G06F 9/445* (2006.01)
*G06F 9/455* (2006.01)

(52) U.S. Cl.
CPC ........ *G06F 9/45504* (2013.01); *G06F 9/4428* (2013.01); *G06F 9/44521* (2013.01)

(58) Field of Classification Search
CPC ............. G06F 9/45504; G06F 9/44521; G06F 9/4428; G06F 8/40
See application file for complete search history.

(56) References Cited

U.S. PATENT DOCUMENTS

| | | | |
|---|---|---|---|
| 6,557,168 B1 * | 4/2003 | Czajkowski | G06F 9/4428 713/375 |
| 6,851,112 B1 * | 2/2005 | Chapman | G06F 9/45504 718/1 |
| 6,938,247 B2 | 8/2005 | Czajkowski | |
| 7,444,631 B2 | 10/2008 | Schwabe et al. | |

(Continued)

OTHER PUBLICATIONS

Czajkowski, G., Application Isolation in the Java Virtual Machine, Proceedings of the 15th ACM SIGPLAN conference on Object-oriented programming, systems, languages, and applications, 2000, pp. 354-366, [retrieved on Feb. 25, 2015], Retrieved from the Internet: <URL:http://dl.acm.org/>.*

(Continued)

*Primary Examiner* — Geoffrey St Leger
(74) *Attorney, Agent, or Firm* — Thomas | Horstemeyer, LLP

(57) ABSTRACT

Disclosed are various embodiments for executing multiple applications in a single virtual machine. The classes of an application executing in the virtual machine are traversed to identify non-sharable static fields. Upon identifying a non-sharable static field, mapping data is created that corresponds to the non-sharable static field. During another traversal of the classes of the application, access to the identified non-sharable static field is translated into an access to the mapping data that is associated with the non-sharable static field.

20 Claims, 6 Drawing Sheets

(56) References Cited

U.S. PATENT DOCUMENTS

| | | | |
|---|---|---|---|
| 7,665,080 B2 | 2/2010 | Spotwood | |
| 8,020,156 B2* | 9/2011 | Atsatt | G06F 9/445 |
| | | | 717/148 |
| 2003/0149967 A1* | 8/2003 | Kamada | G06F 9/445 |
| | | | 717/148 |
| 2004/0255293 A1 | 12/2004 | Spotswood | |
| 2005/0010934 A1* | 1/2005 | Sanouillet | G06F 9/44521 |
| | | | 719/331 |
| 2005/0097550 A1 | 5/2005 | Schwabe et al. | |
| 2007/0061797 A1* | 3/2007 | Atsatt | G06F 9/445 |
| | | | 717/166 |
| 2012/0266147 A1* | 10/2012 | Dawson | G06F 9/547 |
| | | | 717/148 |

OTHER PUBLICATIONS

Higuera-Toledano, M.T., Supporting Several Real-time Applications on the Java Platform, Computer Systems and Applications, 2005, 5 pages, [retrieved on Feb. 25, 2015], Retrieved from the Internet: <URL:http://ieeexplore.ieee.org/>.*

Czajkowski, G., "Application Isolation in the Java Virtual machine, Proceedings of the 15th ACM SIGPLAN conference on Object-oriented programming, systems, languages, and applications," 2000, pp. 354-366 [retrieved on Feb. 25, 2015], Retrieved from the Internet: http://dl.acm.org/.

Higuera-Toledano, M.T., "SupportingSeveral Real-Time Applications on the JAVA Platform, Computer Systems and Applications", 2005, 5 pages [Retrieved on Feb. 25, 2015] from internet http://ieeexlore.ieee.org/.

Krause, J., et al., Safe Class Sharing Among Java Processes, IBM Reserach Report RZ 3230 (#93276), Apr. 24, 2000, 14 pages (retrieved on Mar. 25, 2014 from http://citeseerx.ist.psu.edu.

* cited by examiner

SHARING APPLICATIONS IN A JAVA VIRTUAL MACHINE

CROSS-REFERENCE TO RELATED APPLICATION

This is a continuation of U.S. patent application Ser. No. 12/974,912, entitled "SHARING APPLICATIONS IN A JAVA VIRTUAL MACHINE," and filed Dec. 21, 2010, which is incorporated herein by reference in its entirety.

BACKGROUND

Web server applications may be implemented using a web container application in conjunction with a Java application such as a servlet application. The web container and the servlet application execute on a Java virtual machine within the server. In conventional implementations, each web container is executed in a separate virtual machine, which results in increased usage of server resources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to execution of Java applications in a Java virtual machine. By instancing specific types of fields within Java classes as described herein, multiple Java applications can be executed on the same Java virtual machine. Code sharing between Java applications which use common classes is also facilitated using the techniques described herein.

Figure 1:
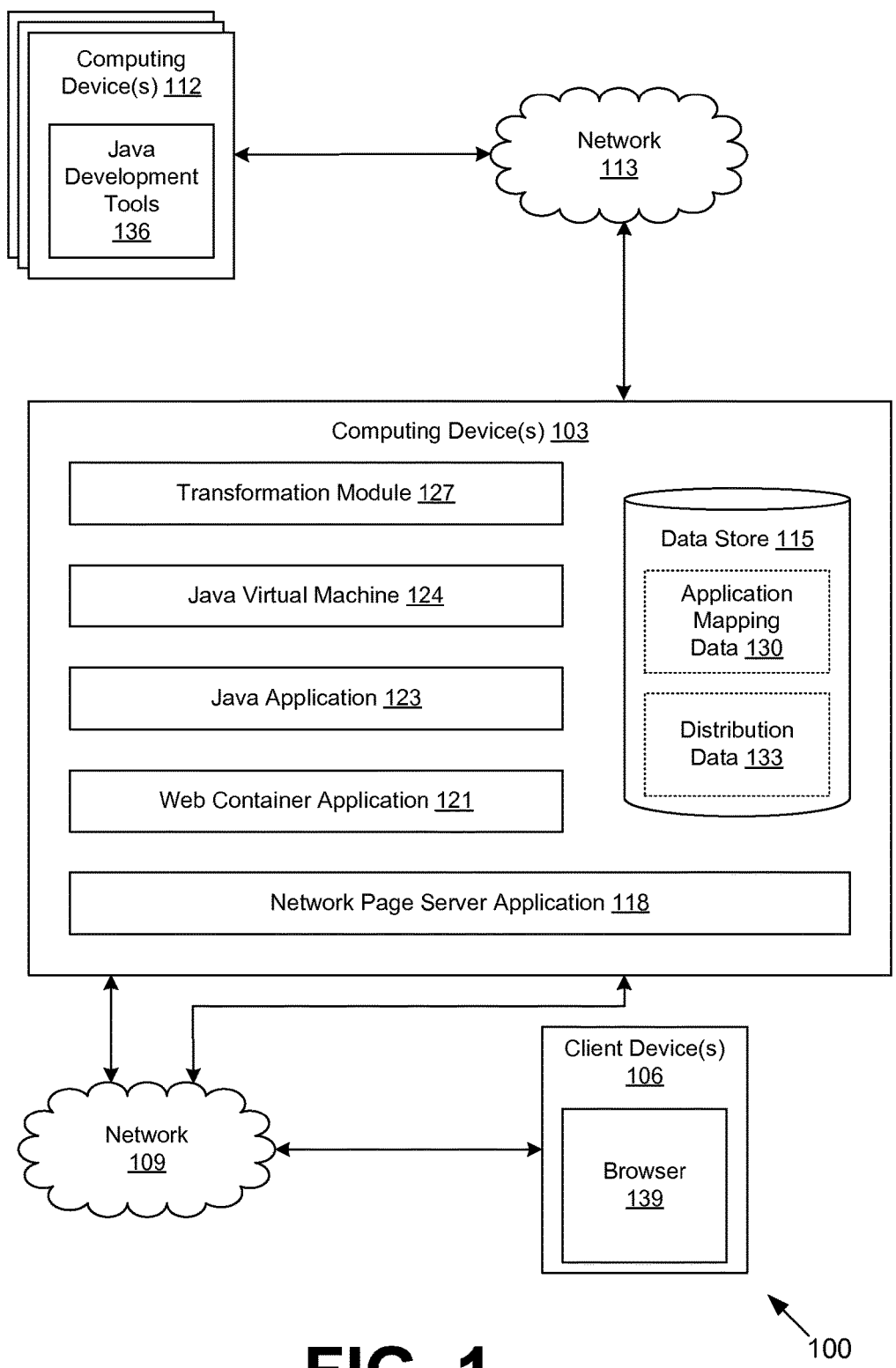
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network environment also includes one or more computing devices 112 in data communication with computing devices 103 by way of a network 113. Each of networks 109, 113 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a network page server application 118, a web container application 121, a Java application 123, a Java virtual machine 124, and an transformation module 127. The components executed on the computing device 103 may also include other applications, services, processes, systems, engines, or functionality not discussed in detail herein. The data stored in the data store 115 includes data accessed by the Java virtual machine 124 and/or the transformation module 127, for example, application mapping data 130, transformation data 131, and deployment data 133, as well as potentially other data.

The computing device 103 acts as a web hosting provider to host network sites for various customers or tenants. To this end, the network page server application 118 is executed to receive requests for network pages associated with one of the hosted network sites. These network page requests are generated by a client device 106 and received over the network 109. The network page server application 118 is further executed to serve up network pages in response to the network page requests. The network page server application 118 may comprise a hypertext transfer protocol (HTTP) server such as Apache® HTTP Server, Microsoft® Internet Information Services (IIS), and/or any other type of network page server application.

In serving up the requested network pages, the network page server application 118 relies on the web container application 121 to generate network content in response to client requests. The web container application 121 does not generate network content directly, but instead executes a Java application on the Java virtual machine 124. The transformation module 127 is executed to alter the Java application so that a single Java virtual machine 124 can host multiple instances of the web container application 121 in a manner which is transparent to the web container application 121. The web container application 121 may be implemented by Apache® Tomcat, Jetty, or any other type of web container application. While the examples herein refer to a Java application, it should be appreciated that Java is merely one example of a language that executes on a virtual machine. The techniques described herein apply to any application that executes on top of a language-specific virtual machine, as should be appreciated.

The computing device 112 is representative of a plurality of computing devices that may be coupled to the network 109. The computing device 112 may comprise, for example, a processor-based system such as a computer system. Such a computer system may be embodied in the form of a desktop computer, a laptop computer, or other devices with like capability.

The computing device 112 may be configured to execute one or more Java development tools 136. A software developer may execute the Java development tools 136 in a computing device 112, for example, to develop Java applications for execution on a Java virtual machine such as Java virtual machine 124. The Java applications may include, for example, Java servlets for use with a Java web container such as web container application 121.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a browser 139 and other applications. The browser 139 may be executed in a client device 106, for example, to access and render network pages, such as web pages, or other network content served up by a web server, a page server, or other servers. In some embodiments, the network content originates from the web container application 121 executing on one of the computing devices 103. The client device 106 may be configured to execute applications beyond browser 139 such as, for example, email applications, instant message applications, and/or other applications.

Figure 2:
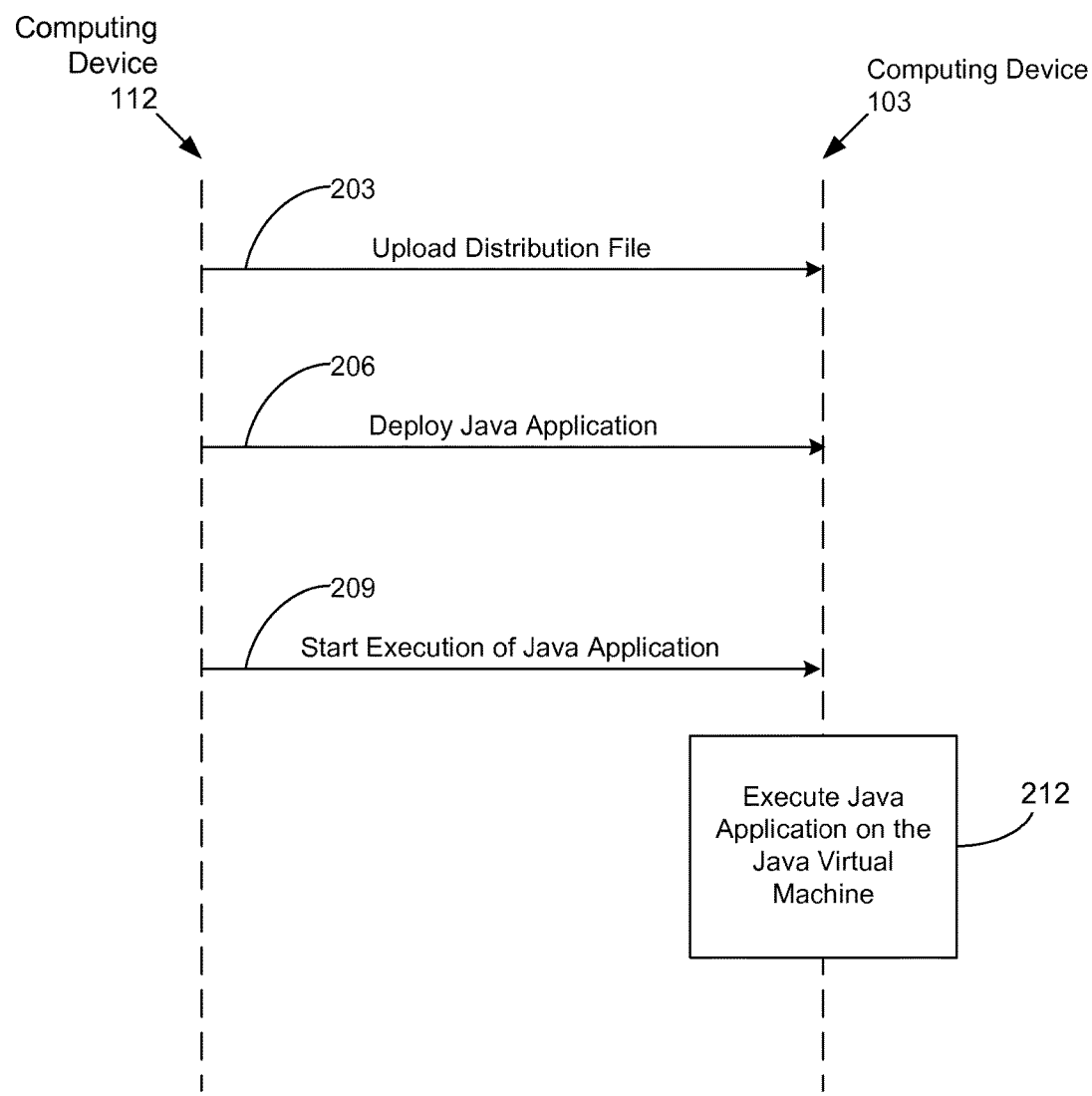
FIG. 2 is a diagram illustrating an example of the operation of a Java virtual machine executed in a computing device in the networked environment of FIG. 1, according to various embodiments of the present disclosure.

Referring next to FIG. 2, a general description is provided for the operation of various components of FIG. 1, according to various embodiments of the present disclosure. To begin, an application developer uses Java development tools 136 executing on the computing device 112 to generate a Java application. Since Java applications typically include more than one file (e.g., multiple .class files), the developer also packages the Java application as a single distribution file, e.g., a Java archive (JAR) file. At step 203, the distribution file containing the Java application is uploaded to the computing device 103. At step 206, the Java application 123 is deployed, or installed, on the computing device 103. The installation may involve, for example, unpacking or uncompressing the individual files in the distribution file, copying the unpacked files to the computing device 103, etc. The installation is performed such that the web container application 121 can locate the newly installed Java application 123 e.g., by copying the unpacked files to a subdirectory that is known to the web container application 121. The web container application 121 may also utilize a deployment descriptor contained within the distribution file to obtain information needed to configure and/or execute the Java application 123.

At step 209, the web container application 121 is instructed to begin executing the Java application 123. In some embodiments, this may occur automatically as a result of deployment. In other embodiments, the application developer sends an explicit command to the web container application 121 to start execution of the Java application 123. At step 212, the web container application 121 begins executing the Java application 123 on the Java virtual machine 124. If the Java virtual machine 124 has not yet been instantiated, the Java virtual machine 124 is created. However, if the Java virtual machine 124 already exists (e.g., because it is already executing another application), Java application 123 may execute on the same Java virtual machine 124. The techniques which allow the web container application 121 to host multiple Java applications in the same Java virtual machine are described in further detail below. Furthermore, though these techniques are described in connection with a web container application 121, the techniques are generally applicable to hosting multiple Java applications in a single Java virtual machine, regardless of whether a container application is present.

As should be appreciated, the Java application 123 includes multiple classes, and although the Java application 123 begins execution within the Java virtual machine 124 at step 212, particular classes within the Java application 123 may not be invoked until a later point in time, for example, when a browser 139 on a client device 106 requests network content which is provided the web container application 121 in conjunction with the Java application 123.

Figure 3A:
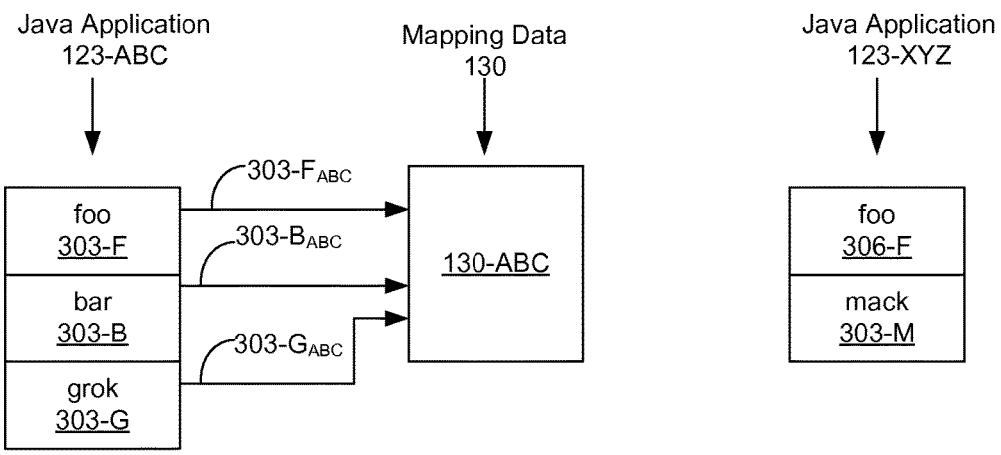
FIGS. 3A and 3B are block diagrams illustrating the use of application mapping data by the Java virtual machine and the translation module of FIG. 1, according to various embodiments of the present disclosure.
Figure 3B:
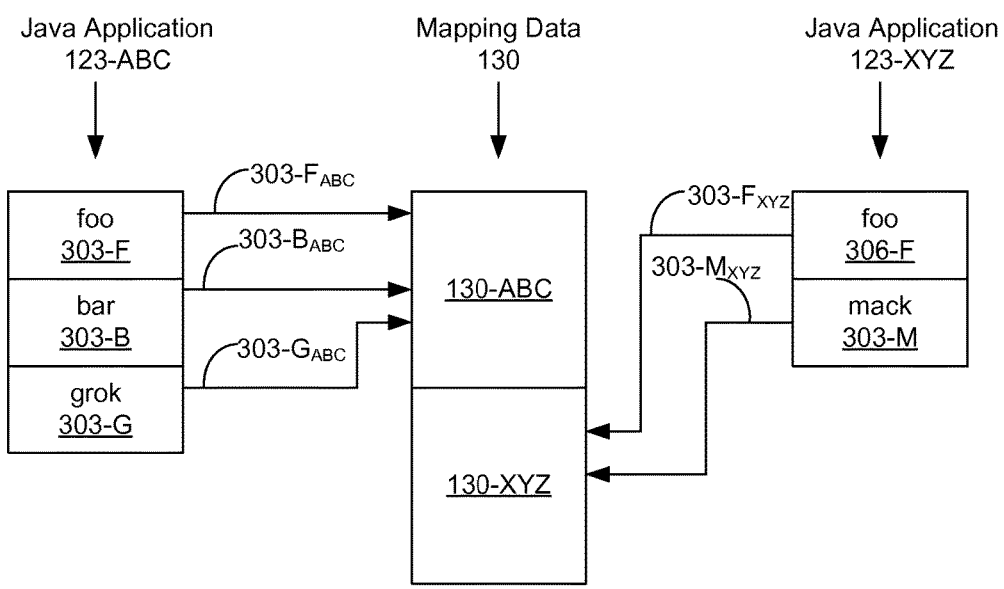

Moving on to FIGS. 3A and 3B, shown are block diagrams illustrating the use of application mapping data 130 by the Java virtual machine 124 and the transformation module 127, according to various embodiments of the present disclosure. FIG. 3A depicts a scenario involving two Java applications installed on the data store 115 of the computing device 112. Java application 123-ABC includes three classes: "foo" (303-F); "bar" (303-B); and "grok" (303-G). Java application 123-XYZ includes two classes: "foo" (306-F); and "mack" (303-M).

In the scenario of FIG. 3A, the Java virtual machine 124 executes the Java application 123-ABC. During this execution, the transformation module 127 creates mapping data 130-ABC, i.e., data specific to application ABC. Mapping data 130-ABC includes fields corresponding to any non-shareable static fields that are used by any class within Java application 123-ABC. This application mapping data 130 is indexed, or keyed, by an identifier for the deployment containing the class. During execution of the Java application 123-ABC, the transformation module 127 also finds any references to these non-shareable static fields made by "foo," "bar," and "grok," and translates these references to the corresponding mapped field within mapping data 130-ABC, as shown by arrows $303F_{ABC}$, $303B_{ABC}$, and $303G_{ABC}$. This translation allows a particular class to be shared when another application using the same class executes in the Java virtual machine.

In the scenario of FIG. 3B, Java application 123-XYZ begins executing in the same Java virtual machine 124 that hosts Java application 123-ABC. During the execution of the Java application 123-XYZ, the transformation module 127 creates mapping data 130-XYZ, i.e., data specific to application XYZ. Mapping data 130-XYZ includes fields corresponding to any non-shareable static fields that are used by any class within Java application 123-XYZ. This application mapping data 130 is indexed, or keyed, by an identifier for the deployment containing the class. During execution of the Java application 123-XYZ, the transformation module 127 also finds any references to these non-shareable static fields made by "foo" and "mack," and translates these references to the corresponding mapped field within mapping data 130-ABC as shown by arrows $303F_{XYZ}$, and 303M$_{XYZ}$. In this example, Java application 123-XYZ includes a class foo which is shared with Java application 123-ABC, by virtue of the mapping data. Java application 123-XYZ also includes a class mack, not present in Java application 123-ABC. Class mack is also instanced through mapping data, so that if another application which uses mack loads later, the class mack will be shared. This instancing of non-shareable data allows multiple Java application to be hosted in the same Java virtual machine 124. The instancing of non-shareable class data will be described in further detail in connection with FIGS. 4A and 4B.

In some embodiments, the transformation of references is done to allow code sharing. When applications share a common class, the code for that class can be shared rather than duplicated. In such embodiments, the transformation module 127 does not use a fixed key to point directly to an application's mapping data 130. Instead, the transformation module 127 uses a global thread local variable to determine the key. The key then corresponds to whatever Java application is currently executing, so that reference to the mapping data 130 accesses the appropriate mapping data, no matter what application is executing.

Figure 4A:
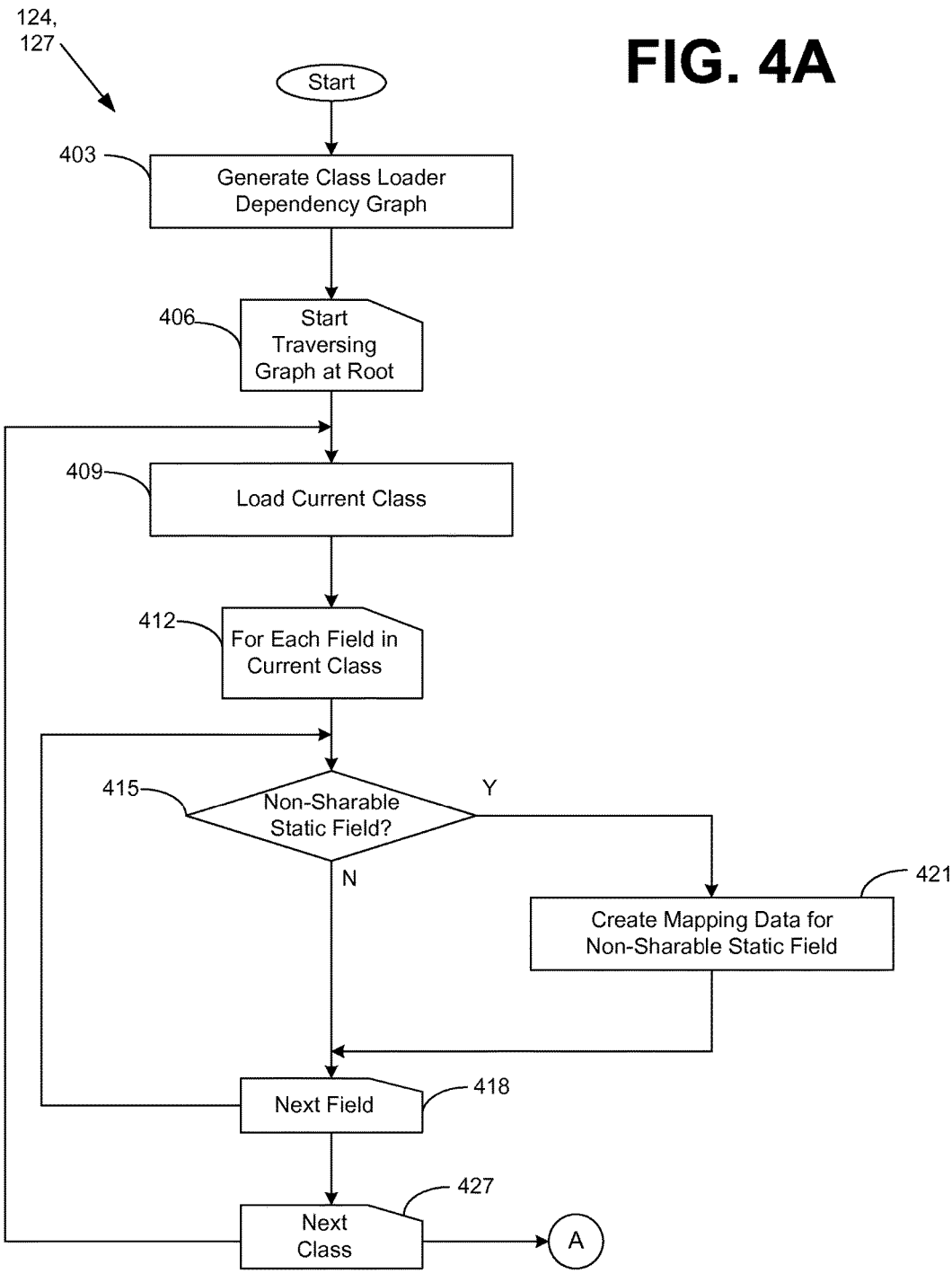
FIGS. 4A and 4B form a flowchart illustrating an example of functionality implemented as portions of a translation module executed in a computing device in the networked environment of FIG. 1 according to various embodiments of the present disclosure.
Figure 4B:
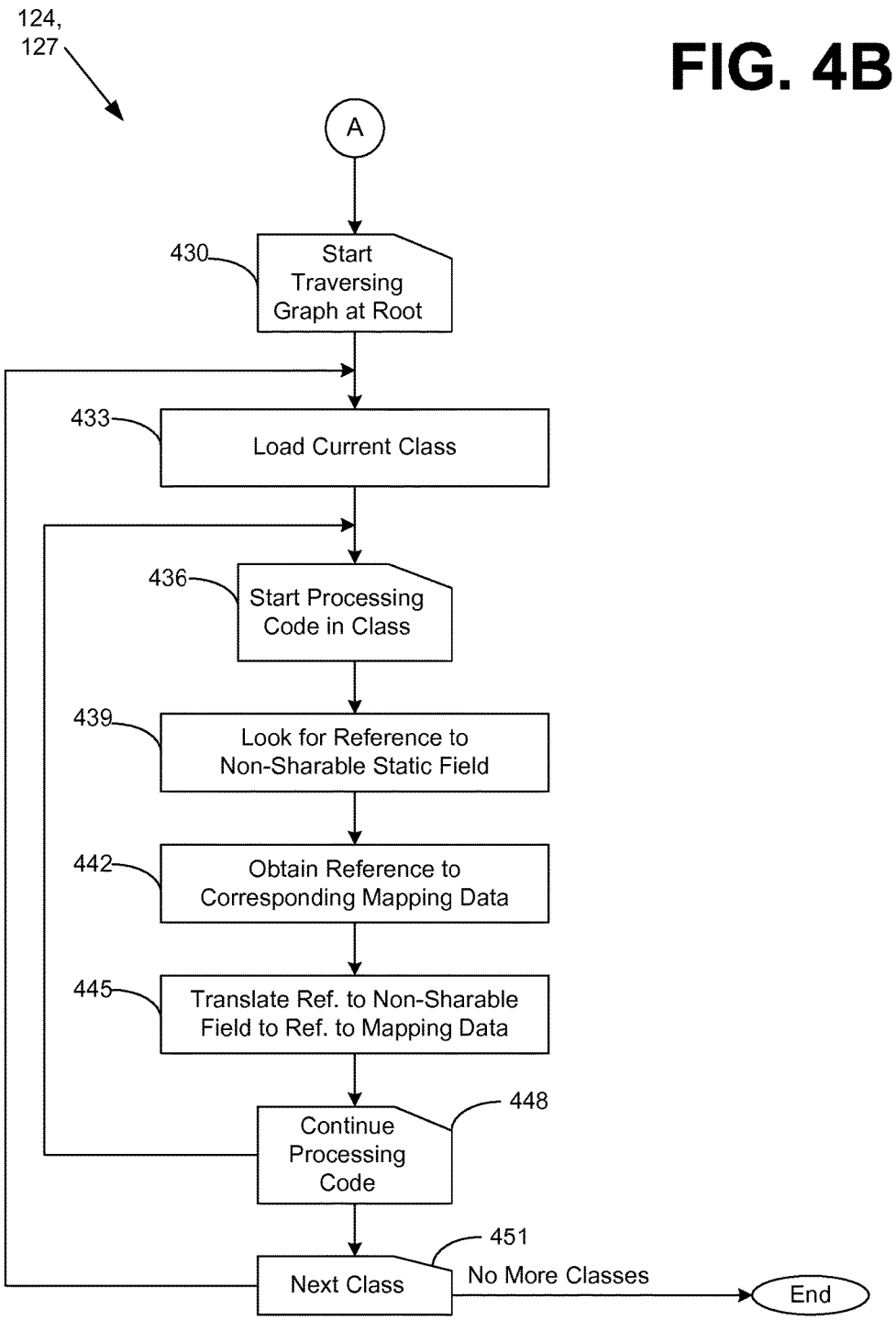

Turning now to FIGS. 4A and 4B, shown is a flowchart that provides one example of the operation of a portion of the transformation module 127 according to various embodiments. It is understood that the flowchart of FIGS. 4A and 4B provides merely an example of the many different types of functional arrangements that may be employed to implement the operation of the portion of the transformation module 127 as described herein. As an alternative, the flowchart of FIG. 4 may be viewed as depicting an example of steps of a method implemented in the computing device 103 (FIG. 1) according to one or more embodiments.

Beginning at box 403 in FIG. 4A, the Java virtual machine 124 executes the Java application 123 by generating a class loader dependency graph, which represents the hierarchy of classes used by the Java application 123. Next at box 406, the Java virtual machine 124 starts to traverse the dependency graph, starting at the root. The current class in the dependency graph is loaded at box 409. Box 412 starts a loop which iterates through all the fields in the current class. At box 415, the Java virtual machine 124 determines whether the current field is a non-shareable static field. As used herein, the term "shareable field" refers to a Java field that is final, stateless, and immutable. In some embodiments, class literals are considered shareable static fields rather than non-shareable static fields. In some embodiments, enumerated types are considered shareable static fields rather than non-shareable static fields. If at box 415 it is determined that the current field is not a non-shareable static field, at the Java virtual machine 124 continues processing for the current field and then at box 418 moves to the next field in the current class. The iteration loop continues at box 415.

If at box 415 it is determined that the current field is a non-shareable static field, the transformation module 127 is invoked. At box 421, the transformation module 127 creates application mapping data 130 for the non-shareable static field. The application mapping data 130 is created to be accessible by an identifier for the deployment containing the class being loaded, i.e., the class that caused the transformation module 127 to be invoked at box 421. In some embodiments, the application mapping data 130 is stored in a hash table, using the deployment identifier as the key.

Having handled the current field, the transformation module 127 returns control to the Java virtual machine 124, which continues processing for the current field and then at box 418, moves to the next field in the current class. The iteration loop continues at box 415.

When all fields in the current class have been iterated, the field iteration loop completes. Next, at box 427, the Java virtual machine 124 moves to the next class in the class loader dependency graph. The iteration loop continues at box 409, where the current class is loaded and then processed, as explained above.

When all classes in the class hierarchy have been traversed, the class traversal loop completes. At this point, all non-shareable static fields in the classes making up the Java application 123 have been mapped, but code (i.e., methods) within the Java application 123 still refer to the original fields rather than the mapped fields. Therefore, the Java virtual machine 124 traverses the class hierarchy again to translate these references.

The flowchart continues in FIG. 4B. The additional traversal of the class loader dependency graph begins at box 430 with the root class. The current class in the dependency graph is loaded at box 433. Box 436 starts processing the code in the current class. At box 439, the Java virtual machine 124 looks in the code for a reference to a non-shareable static field. At box 442 the Java virtual machine 124 invokes the transformation module 127, which obtains a reference to the application mapping data 130 corresponding to the non-shareable field. Next at box 445 the transformation module 127 translates the reference to the non-shareable field to the reference to mapping data. At box 448 the Java virtual machine 124 moves to the next method in the current class and the iteration loop continues at box 436, When all methods in the current class have been iterated, the method iteration completes. Next, at box 451, the Java virtual machine 124 moves to the next class in the class loader dependency graph. The iteration loop continues at box 409, where the current class is loaded and processed, as explained above. When all classes in the class loader dependency graph have been traversed, the class traversal loop completes. The process of FIG. 4 is then complete.

In some embodiments, the class dependency graph and the translated classes are stored in the transformation data 131 of data store 115 for later re-use. In such embodiments, when the transformation module 127 encounters a class that has already been processed, the dependency graph for the class and the transformed code for the class may be loaded from storage rather than being generated again. To accomplish this caching, the transformation module 127 may generate a unique identifier for each component that is encountered (e.g., JAR file, class file, and any component in between). The dependency graph and transformed code may then be stored to be accessible by the unique identifier, for example, in a persistent hash table.

In the manner described in connection with the flowchart of FIGS. 4A and 4B, the Java virtual machine 124 and the transformation module 127 have replaced all references to non-shareable static fields with references to corresponding mapped data. This instancing of static data allows multiple Java applications to be hosted in the same Java virtual machine 124.

Figure 5:
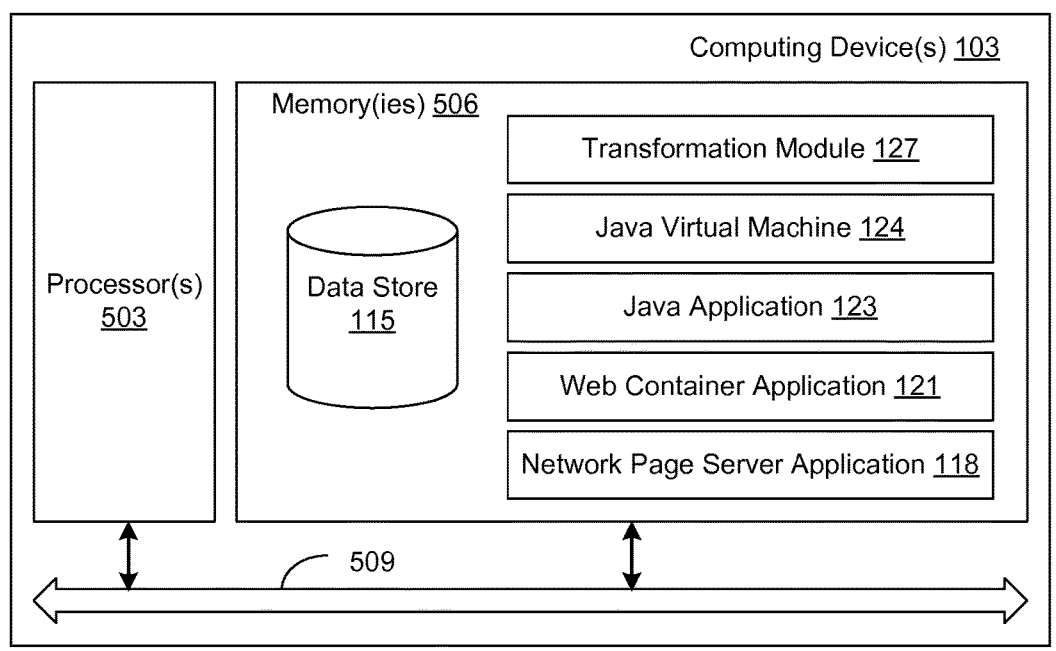
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the transformation module 127, the Java virtual machine 124, the Java application 123, the web container application 121, the network page server application 118, and potentially other applications. Also stored in the memory 506 may be a data store 115 and other data. In addition, an operating system may be stored in the memory 506 and executable by the processor 503. While not illustrated, the computing device 112 and the client device 106 also include components like those shown in FIG. 5, whereby transformation module 127 is stored in a memory and executable by a processor.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Pen, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the transformation module 127 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the transformation module 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the transformation module 127, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, wherein, when executed, the program causes the at least one computing device to at least:
conduct a first traversal of a class loader dependency graph corresponding to a plurality of classes of an application;
during the first traversal of the class loader dependency graph,
identify a non-sharable static field within the plurality of classes; and
create mapping data for the application in response to identifying the non-sharable static field, the mapping data including data corresponding to an instance of the non-sharable static field;
conduct a second traversal of the class loader dependency graph corresponding to the plurality of classes following completion of the first traversal; and
translate, during the second traversal, an access to the non-sharable static field within the plurality of classes into a translated access to the instance of the non-sharable static field in the mapping data.

2. The non-transitory computer-readable medium of claim 1, wherein, when executed, the program further causes the at least one computing device to at least generate an initializer associated with the non-sharable static field in response to the mapping data being created.

3. The non-transitory computer-readable medium of claim 1, wherein, when executed, the program further causes the at least one computing device to at least store the mapping data in a hash table.

4. The non-transitory computer-readable medium of claim 1, wherein the mapping data is keyed by an identifier associated with a deployment including the application.

5. The non-transitory computer-readable medium of claim 1, wherein a sharable static field is final, stateless, and immutable, and the non-sharable static field is different from the sharable static field.

6. The non-transitory computer-readable medium of claim 1, wherein the application is a Java application that is configured to be executed by a Java virtual machine.

7. The non-transitory computer-readable medium of claim 1, wherein, when executed, the program further causes the at least one computing device to at least build the class loader dependency graph corresponding to the plurality of classes used by the application.

8. A system, comprising:
at least one computing device comprising a processor and a memory; and
a virtual machine executable by the at least one computing device, wherein, when executed, the virtual machine causes the at least one computing device to at least:
perform a first traversal of a class loader dependency graph corresponding to a plurality of classes of an application;
during the first traversal,
identify a non-sharable static field in the plurality of classes; and
create mapping data corresponding to the application in response to identifying the non-sharable static field, the mapping data including a mapped field associated with an instance of the non-sharable static field;
perform a second traversal of the class loader dependency graph corresponding to the plurality of classes; and
translate, during the second traversal, an access to the non-sharable static field into a translated access to the instance of the non-sharable static field within the mapped field of the mapping data.

9. The system of claim 8, wherein, when executed, the virtual machine further causes the at least one computing device to at least generate, during the first traversal, an initializer associated with the non-sharable static field.

10. The system of claim 8, wherein the mapping data is keyed by an identifier associated with a deployment including the application.

11. The system of claim 8, wherein, when executed, the virtual machine further causes the at least one computing device to at least execute the application in response to receiving a request to execute the application.

12. The system of claim 8, wherein, when executed, the virtual machine further causes the at least one computing device to at least repeat the first traversal and the second traversal for a second plurality of classes associated with another application in response to receiving a request to execute the other application.

13. The system of claim 8, wherein the non-sharable static field is at least one of non-final, mutable, or stateful.

14. A method, comprising:
executing, via at least one of one or more computing devices, an application in a virtual machine, wherein executing the application comprises:
performing, via at least one of the one or more computing devices, a first traversal of a class loader dependency graph corresponding to a plurality of classes in the application;
during the first traversal, identifying, via at least one of the one or more computing devices, a non-sharable static field in the plurality of classes; and creating, via at least one of the one or more computing devices, mapping data, a mapped field in the mapping data being associated with an instance of the non-sharable static field;

performing, via at least one of the one or more computing devices, a second traversal of the class loader dependency graph corresponding to the plurality of classes; and during the second traversal, translating, via at least one of the one or more computing devices, an access to the non-sharable static field into a translated access to the instance of the non-sharable static field in the mapped field in the mapping data.

15. The method of claim 14, further comprising receiving, via at least one of the one or more computing devices, a request to execute the application in the virtual machine.

16. The method of claim 14, further comprising receiving, via at least one of the one or more computing devices, a request to execute another application in the virtual machine.

17. The method of claim 16, further comprising executing, via at least one of the one or more computing devices, the other application in the virtual machine.

18. The method of claim 14, further comprising generating, via at least one of the one or more computing devices, an initializer associated with the non-sharable static field in response to creating the mapping data.

19. The method of claim 14, further comprising storing, via at least one of the one or more computing devices, the mapping data in a hash table keyed by an identifier associated with a deployment including the application.

20. The method of claim 14, wherein the translated access uses a global thread local variable indicating a currently executing application to determine an identifier for accessing the mapping data.

* * * * *